June 19, 1928.

C. V. FULTON ET AL

CARRIER OR SUPPORT FOR ICE CREAM CONTAINERS

Filed Oct. 20, 1927    2 Sheets-Sheet 1

1,673,869

Claude Victor Fulton
Melville Plant Daymond
INVENTORS

By Otto Munk
their ATTY.

June 19, 1928.

C. V. FULTON ET AL 1,673,869

CARRIER OR SUPPORT FOR ICE CREAM CONTAINERS

Filed Oct. 20, 1927   2 Sheets-Sheet 2

Claude Victor Fulton
Melville Plant Daymond
INVENTORS

By
their ATT'Y.

Patented June 19, 1928.

1,673,869

UNITED STATES PATENT OFFICE.

CLAUDE VICTOR FULTON, OF HYDE PARK, SOUTH AUSTRALIA, AND MELVILLE PLANT DAYMOND, OF SYDNEY, NEW SOUTH WALES, AUSTRALIA.

CARRIER OR SUPPORT FOR ICE-CREAM CONTAINERS.

Application filed October 20, 1927, Serial No. 227,494, and in Australia November 23, 1926.

Our invention relates to a collapsible carrier or support for ice cream containers, the object of the invention being to provide means whereby ice cream cups or cones can be supported by means of a conveniently shaped inexpensive device and can be carried from place to place without necessitating the separate handling of the cups or cones, the device being made from a sheet of cardboard or the like which is cut and bent or folded for the purpose indicated, portions of the structure being interlocked and firmly held together.

In carrying our invention into effect we make use of a strip of cardboard or other suitable material through which holes of suitable diameter and shape are punched or cut for the reception of a corresponding number of cups or cones, four such holes being convenient, but this number may be varied according to requirements. If cones are used elongated holes are additionally formed for the reception of the bottom ends of the cones, the elongation being necessary because the lower supporting or retaining openings are presented at a slope or angle upon the sides of the support as hereinafter explained.

The holes thus made are of sufficient diameter to receive the cups or cones and the cardboard is cut and folded in such a manner that it forms a strong triangular shaped support of sufficient height for the purpose required, the upper holes being preferably serrated round their edges so that when depressed by the entrance of the cup or cone the serrated portions constitute somewhat of a grip thus assisting to retain the cups or cones in place.

The device may be cut in various forms from a single piece of cardboard according to preferments, and we have, therefore, shown three forms of construction in the accompanying drawings in each of which the principle of cutting, folding and interlocking the parts is substantially the same.

We have shown the preferred form in Figs. 1 to 5 of the accompanying drawings wherein:—

Figure 6:
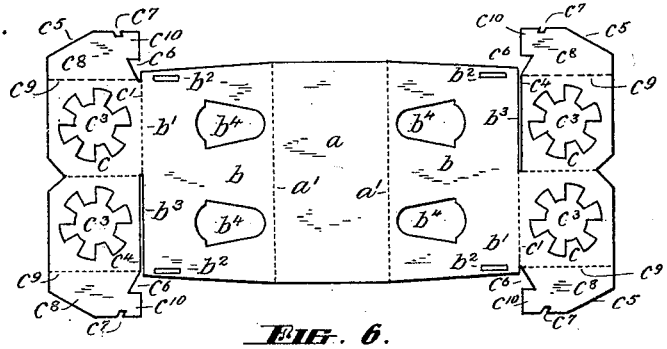
Fig. 6 is a plan of the device embracing a slight modification in the cutting and folding.
Figure 7:
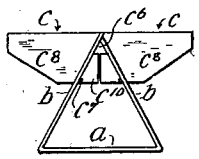

Fig. 7 side view of Fig. 6 with parts bent, folded and locked on triangular supporting base.

Figure 8:
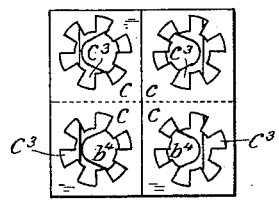

Fig. 8 plan of Fig. 7.

Figure 9:
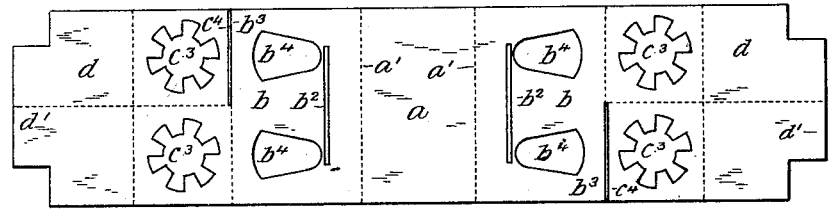

Fig. 9 is a plan showing a further method of cutting and folding the material.

Figure 10:
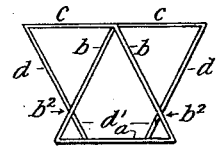

Fig. 10 is a side view of the device folded and locked in the supporting base.

Figure 11:
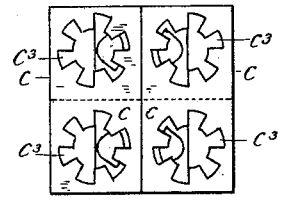

Fig. 11 is a plan of Fig. 10.

In each of the illustrations similar letters of reference are used to denote similar or corresponding parts wherever they occur, and in parts of the drawing dotted lines are used to indicate the locating of folds or creases.

Figure 1:
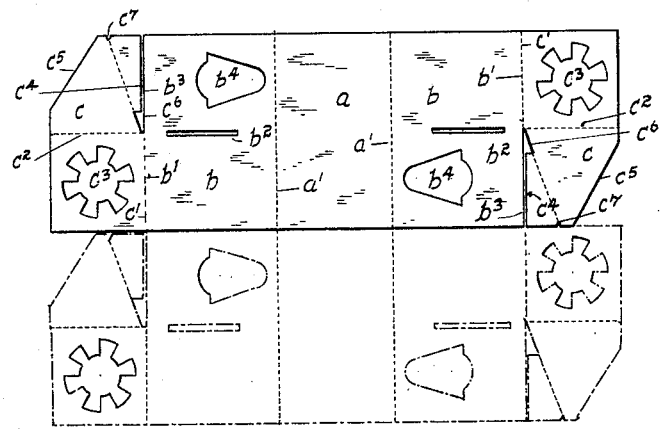
Fig. 1 is a plan showing simple construction of the device for the accommodation of two cups or cones on a triangular base showing also an integral duplicate part to render it suitable for four or more cups or cones by the addition or repetition of that part which is indicated by dots below the thick dividing line.

Dealing first with Figs. 1 to 5 and referring more particularly at first to the upper portion of Fig. 1.

In these illustrations $a$ is the centre portion of a strip of cardboard adapted to be folded along the dotted lines $a'—a'$. On each side thereof are intermediate portions or strips $b$ and $b$ which are adapted to be folded along the dotted lines $b'—b'$ and these strips are each furnished with a narrow locking slot $b^2$ an edge being cut for a distance equal to half the width of the main strip as shown by the solid line $b^3$.

Upon each side of the strips $b$ we form the outer folding strips $c$ which are adapted to be folded along the dotted line $c'$ which is in alignment with the cut line $b'$ previously referred to. In the drawings the letters $b'$ and $c'$ and the letters $b^3$ and $c^4$ indicate opposite edges or sides of the same cut.

In these end strips there is an intermediate fold along the dotted line $c^2$ and in one part of the portion $c$ we cut a hole $c^3$ which is preferably formed with a serrated or notched edge as clearly indicated in the drawings, such edge being capable of being depressed for the reception of a cup or cone, the depression being sufficient to enable the cup or cone to pass through the centre of the opening and to be maintained therein by the deflected notched portions, and holes $b^4$ preferably of the shape illustrated are cut in the plates $b$ for the reception of the ends of the cones when the sheet is subsequently folded.

The opposite half of the strips $c$ are completely severed from the strip $b$ by the cut edge $c^4$ coincident with the cut $b^3$ and on the opposite side of the severed portion there is a diagonal cut forming the edge $c^5$ which for preference constitutes an angle of about sixty degrees. The opposite side is not cut away in the same manner but is a straight cut at right angles to the centre line of the card as will be readily seen and is provided with a notch or cut away portion $c^6$ near the base or folding edge of this member and also a cut away portion or notch $c^7$ along the outer straight edge, the inner edge of the notches being cut at approximately the same angle as the edge $c^5$.

The device which is thus described is capable of being folded to form a support for two cones or cups if its width extends from the top of the diagram to the thick line across the centre of the figure, and if these parts are repeated below the centre line of the figure as illustrated in dotted lines it can be folded to form a support for four cups or cones and the number of supporting plates can be increased by extending the width of the sheet to form a series of areas of similar width and arrangement to that which is shown by the dotted lines.

Figure 2:
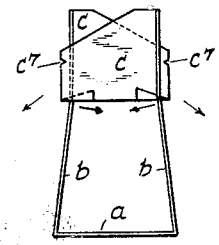
Fig. 2 is a side view showing the position of the parts at the first stage of folding.

In Fig. 2 we have indicated the preliminary movements or bends for locking the structure together. It may be mentioned that the operation of folding will be facilitated if the operator crosses his hands so as to grip the right hand side with the left fingers and thumb, and in this illustration the plate or area $a$ forms the base and the plates or areas $b$ form the sides and are slightly turned in towards each other and the plate $c$ is bent at right angles to the cup containing portion so that it lies above the space formed by the areas $a$, $b$ and $c$, but is intended to be further folded in the direction indicated by the adjacent outer arrows.

Figures 3, 4:
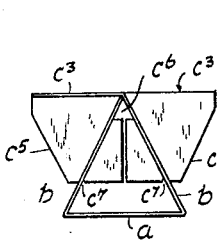
Fig. 3 is a side view with supporting parts brought together in the form of a triangle, the interlocking parts being folded down as in the illustration and adapted to be further deflected along the course of the arrows.
Fig. 4 illustrates the parts completely folded and locked in position on the triangular base.
Figure 5:
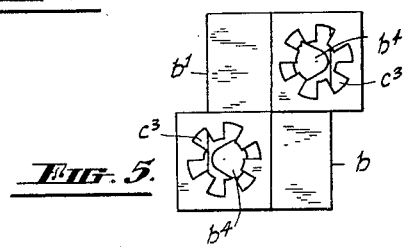
Fig. 5 is a plan of Fig. 4 showing the holes for the reception of the cups or cones.

The further folding of these pieces is illustrated in Fig. 3 of the drawings. In this figure the plate $a$ continues to remain the foundation or base of the structure and the plates $b-b$ have been brought together in the form of a triangle whilst the outer portion of the plate $c$ is still further downwardly deflected in the direction of the arrows which point to the position which the slot $b^2$ of Fig. 1 will occupy.

In Fig. 4 the folding of the device has been completed, the edges $c^4$ have been brought adjacent to each other, and portions of the plates $c$ containing the edges $c^4$ have been passed through the slots $b^2$ and are retained therein by aid of the notches $c^7$ the small triangular cuts $c^6$ being adjacent to each other leaving a clear space at the apex of the triangle, and in the position shown by Fig. 4 it will be seen that a miniature table top supported on a triangular base has been formed, and if viewed from the top will show the position of the openings $c^3$ for the reception of the ice cream cups or cones, the cut away portion $b^4$ formed in the plate $b$ being in a suitable position below the openings $c^3$ to receive the bottom end of the cone and as previously indicated this form of structure can be duplicated or multiplied by increasing the width of the strip of cardboard and repeating the cutting and bending as indicated by the dotted lines shown in a portion of Fig. 1.

In Figs. 6, 7 and 8 we have shown a modification of the structure but without departing from the nature or principle of our invention, the central parts $a$ and $b$ being used and being extended by the outer flaps $c$ which are partly cut along the lines or contiguous edges $b^3$ and $c^4$ as in the previous arrangement and likewise folded along the common dotted lines $b'$ and $c'$.

In this structure which provides for the accommodation of four cups or cones instead of two, the rectangular formation of the centre portion may be slightly reduced in width and cut or trimmed as illustrated and the end portions of the plate $c$ are correspondingly slightly increased in width, the notches $c^6$ and $c^7$ being retained in the positions shown and an angled edge of the plate being cut at $c^5$ as in the previous examples. In this illustration (Fig. 6) the width of the plate $c$ being slightly increased forms the overhanging portion or plate $c^8$ in which the cut away notches $c^6$ and $c^7$ of the previous figures are included, and the plate is adapted to fold along the cutting lines $c^9$ as shown in the illustration.

In the body of this figure the slots $b^2$ in the plates $b$ correspond with the locking slots $b^2$ in Fig. 1, but are much smaller being only required to accommodate the corner portions $c^{10}$ which register therewith when the end pieces are folded.

In this device we still retain the serrated openings $c^3$ for the reception of the cups or cones, the stems of the cones being capable of being accommodated in the openings $b^4$ formed in the plates $b$ as previously explained.

In Fig. 7 we have indicated the crossing over and closing of various parts, the triangular supporting device being maintained and in Fig. 8 the relative position of the four holes $c^3$ and $b^4$ is maintained when the device is folded.

In the further arrangement shown in Figs. 9, 10 and 11 similar or corresponding parts are retained and are lettered accordingly except that the extended portion $d$ which is notched at its corners takes the place of the triangular cut indicated at $c^5$ in Fig. 1, the tongue or extension $d'$ being adapted when folded properly to fit into the slots $b^2$ on the plates $b$ as will be easily understood.

In Fig. 10 an end view of the folding of the device is shown illustrating the maintenance and position of the triangular base and sides, and of the notched extended portion $d$ and $d'$ the latter part having been passed through the slots $b^2$ as previously and as will be easily understood and the position of the openings for the cones or cups is illustrated in Fig. 11 of the drawings.

When it is desired to use our invention for the purposes for which it is designed the several parts are bent and folded together in the manner illustrated in the drawings so that a miniature table supported on a triangular base is provided having openings $c^3$ of suitable size or shape for the accommodation of the cups or cones and the openings $b^4$ of the folding members $b'$ are adapted to occupy a position for the reception of the bottom of the cones as clearly indicated in the drawings.

What we claim is:—

A folding carrier or support for ice cream containers consisting of a sheet of cardboard or other suitable material having a central area which is divided into three parts bent or folded to constitute the base and two sides of a triangular shaped supporting structure, and having end flaps integral therewith which are partially severed by cuts parallel to the folds of the central area which said cuts extend from opposite sides to approximately half the width of the centre portion, a folding line along which the partially severed portion is bent at right angles to the plate or surface of the end flaps, and locking slots and notches cut in the areas which form the sides of the triangular structure, said slots being adapted to receive and retain the partially severed portion, and holes for the reception and retention of the cups or cones.

In testimony whereof we affix our signatures.

CLAUDE VICTOR FULTON.
MELVILLE PLANT DAYMOND.